Jan. 1, 1924

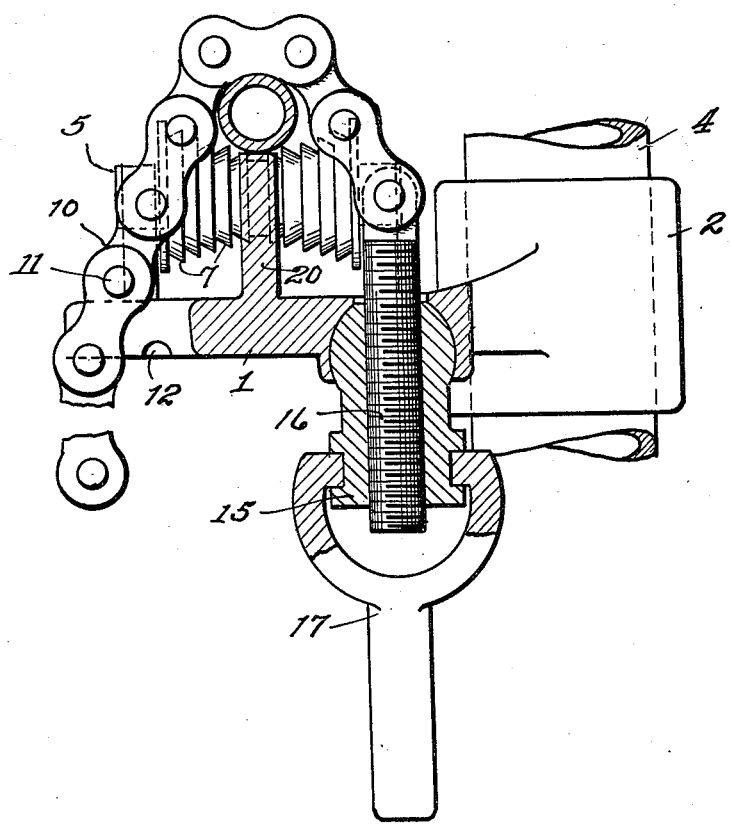

J. TRICKEL

PIPE VISE

Filed April 21, 1923     2 Sheets-Sheet 1

1,479,341

Joseph Trickel, Inventor

By [signature], Attorney

Patented Jan. 1, 1924.

1,479,341

UNITED STATES PATENT OFFICE.

JOSEPH TRICKEL, OF READING, PENNSYLVANIA.

PIPE VISE.

Application filed April 21, 1923. Serial No. 633,597.

*To all whom it may concern:*

Be it known that I, JOSEPH TRICKEL, a citizen of the United States, residing at Reading, in the county of Berks and State of Pennsylvania, have invented certain new and useful Improvements in Pipe Vises, of which the following is a specification.

This invention relates to improvements in pipe vises, and the object in the present invention is to provide a pipe vise of comparatively simple construction, one in which varied sizes of pipe may be securely held, and one in which the pipe may be easily and rapidly released from engagement by the vise.

A further object is to provide a vise in which pipe of relatively small diameter may be securely gripped and held without crushing it, as is so often the case with ordinary devices for this purpose.

The invention consists of a base plate in which are mounted two, parallel rollers, provided with annular serrations, and whose smallest diameters are at the longitudinal centres, and a centrally disposed post upon which the pipe of small diameter will rest when being gripped and held in position in the vise, together with a flexible member, preferably in the form of a link chain, adapted to partly surround the pipe, and means for drawing this chain taut and securing it in tightened position.

The invention may be provided with means for securing it to a table, or, as shown in the drawings, with means for securing it to some suitable vertical post or upright.

The invention is more fully described in the following specification and clearly illustrated in the accompanying drawing, in which:—

Figure 3 is a sectional view, taken centrally through Figure 1, on the line 3.

Figure 1:
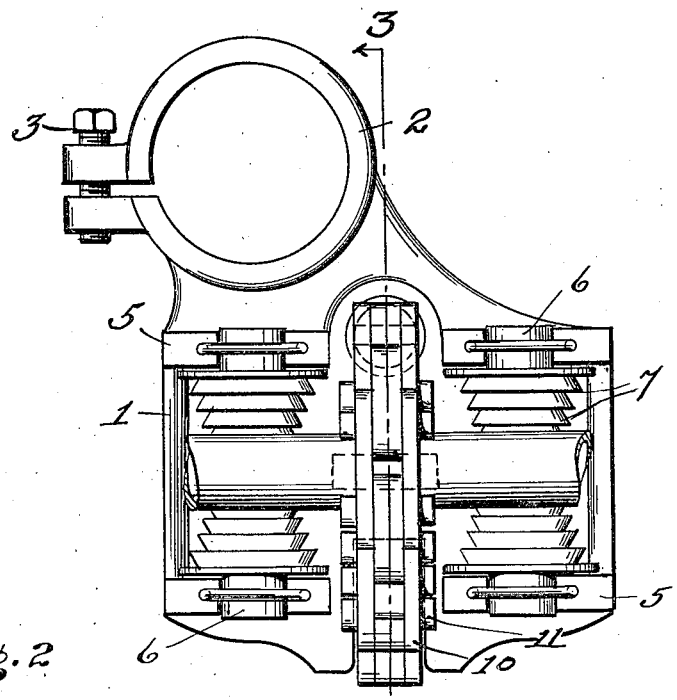
Figure 1 is a plan view of my device.
Figure 2:
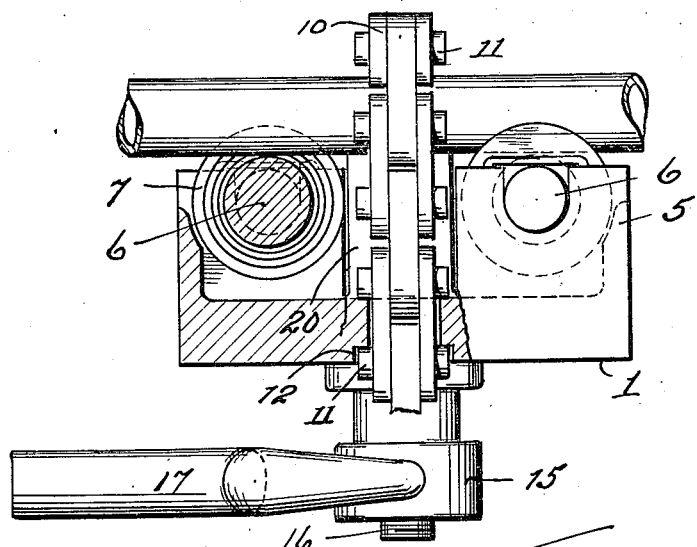
Figure 2 is an end elevational view thereof, partly in section.

The numeral 1 designates the base plate, and this is formed with means for securing it in position, preferably a split sleeve 2 provided with a set screw 3, by means of which the device may be secured to an upright or post 4.

The base plate is formed with upstanding portions 5, providing bearings for a pair of rolls 6 which are rotatably mounted therein. These rolls are formed with annular serrations 7 and are arranged parallel with each other.

The rolls are smaller in diameter at their longitudinal centres than at either end, and the pipe to be secured will rest upon the surfaces of the rolls.

The numeral 10 designates a flexible member, preferably in the form of a link chain, which serves as the medium for securely holding the pipe against the serrated rolls. This chain is provided with the usual link pins 11 the ends of which project slightly from both sides of the links, and the under face of the base plate is provided with a pair of indentations 12, adapted to receive the projecting ends of one of the link pins. The other end of the chain is provided with a suitable tightening means, preferably in the form of a sleeve 15 and a screw 16, which sleeve is provided with an operating handle 17 whereby, the turning of the handle will tighten the chain and draw it tightly against the surface of the pipe, when the latter is in position across the rolls.

On the base plate, located between the rolls, I form a vertical post or support 20, the upper end of which is about in horizontal alinement with the centre or lesser diameters of the rolls, so that, when a pipe of relatively small diameter is to be secured in the vise, it will rest upon this post as well as upon the serrated roll surfaces.

This support will prevent the crushing of the pipe when the chain is drawn taut. Larger diameter pipe will not rest upon the post when lying across the rolls, due to the larger diameter, but this support will not be required in other than pipe of relatively small diameters.

It is evident therefore, that to secure the pipe in the vise, it will be laid across the rolls, the free end of the chain placed over it, with the end hanging down across the base plate. One of the link pins is then placed in engagement with the indentations on the under face of the plate, and the handle 17 is turned until the chain is taut, thus securely holding the pipe in position in the vise. To release the pipe, it is only necessary to turn the handle 17 slightly in the opposite direction, which will permit the disengagement of the link pins with the base plate, and permit the pipe to be withdrawn.

Having thus fully described my invention, what I claim and desire to secure by Letters Patent is:—

1. In a pipe vise, the combination of a base, a pair of parallel, annularly serrated rolls of varied diameter mounted on the base for rotation, a vertical pipe supporting post located between the rolls, a chain for holding the pipe in contact against the rolls, and means for drawing said chain taut and means for holding the chain in position when so drawn.

2. In a device of the character and for the purpose described, the combination of a base plate provided with a plurality of vertical bearings and formed with an indentation on its under side; a pair of parallel, annularly serrated rolls of varied diameter rotatably mounted on said bearings; a flexible pipe gripping member having a screw threaded portion at one end passing through the plate, and a tightening device on said screw, said flexible member having a plurality of projections adapted to engage the indentations on the plate, and a vertical pipe supporting post located on the plate, between the rolls at their smaller diameters.

3. In a pipe vise, a base plate, a pair of parallel, annularly serrated rolls mounted rotatably thereon, said rolls being greater in diameter at the ends than at the centre, a vertical pipe supporting post located on the base and between the rolls, a flexible pipe securing member, a depression in the base plate for engagement by the chain, and a screw device in the base plate and attached to the chain, whereby the chain may be drawn taut against the pipe when in position on the rolls.

In testimony whereof I affix my signature.

JOSEPH TRICKEL.